No. 843,712. PATENTED FEB. 12, 1907.
E. A. STRAUB.
IMITATION TREE.
APPLICATION FILED SEPT. 13, 1906.
2 SHEETS—SHEET 2.
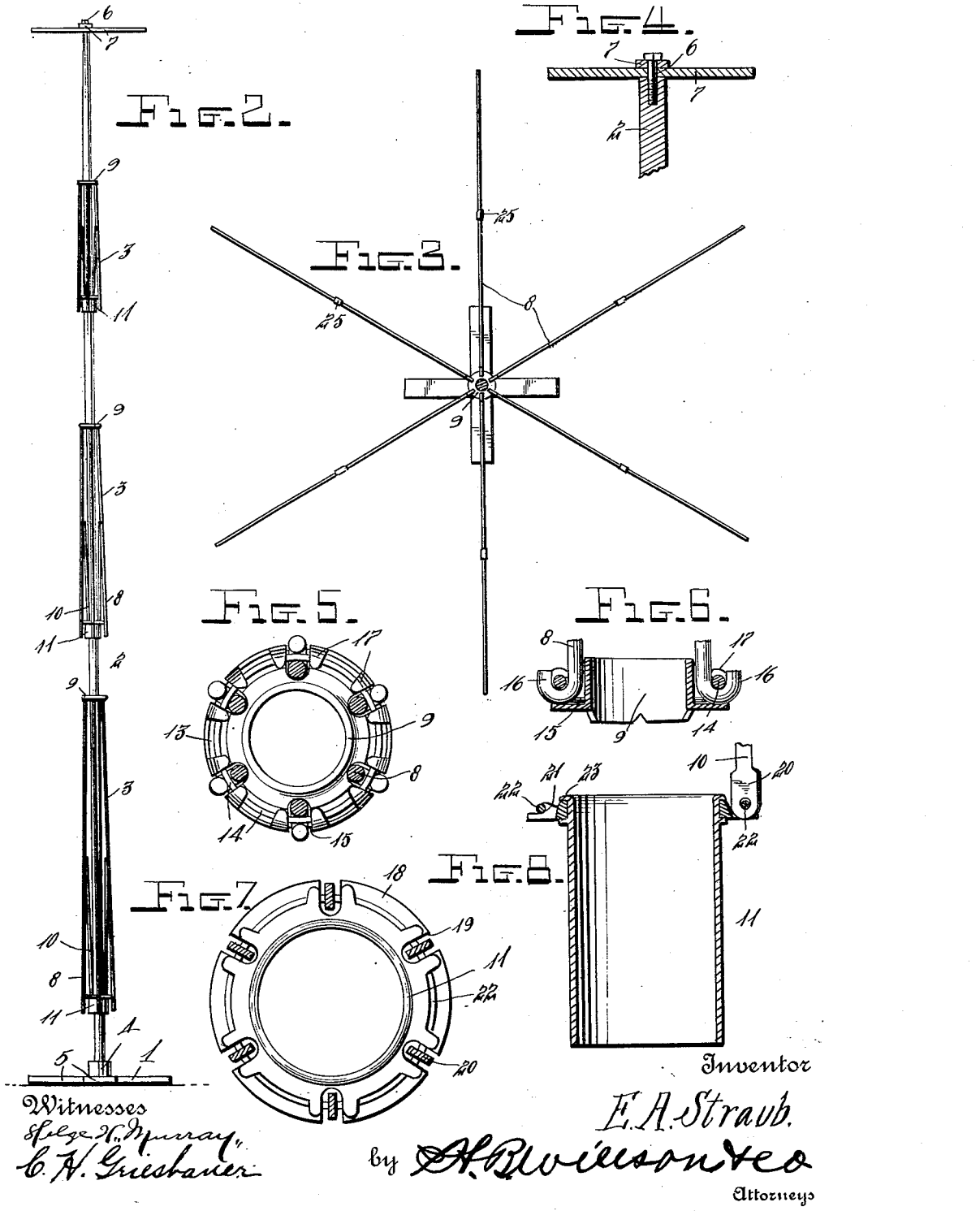

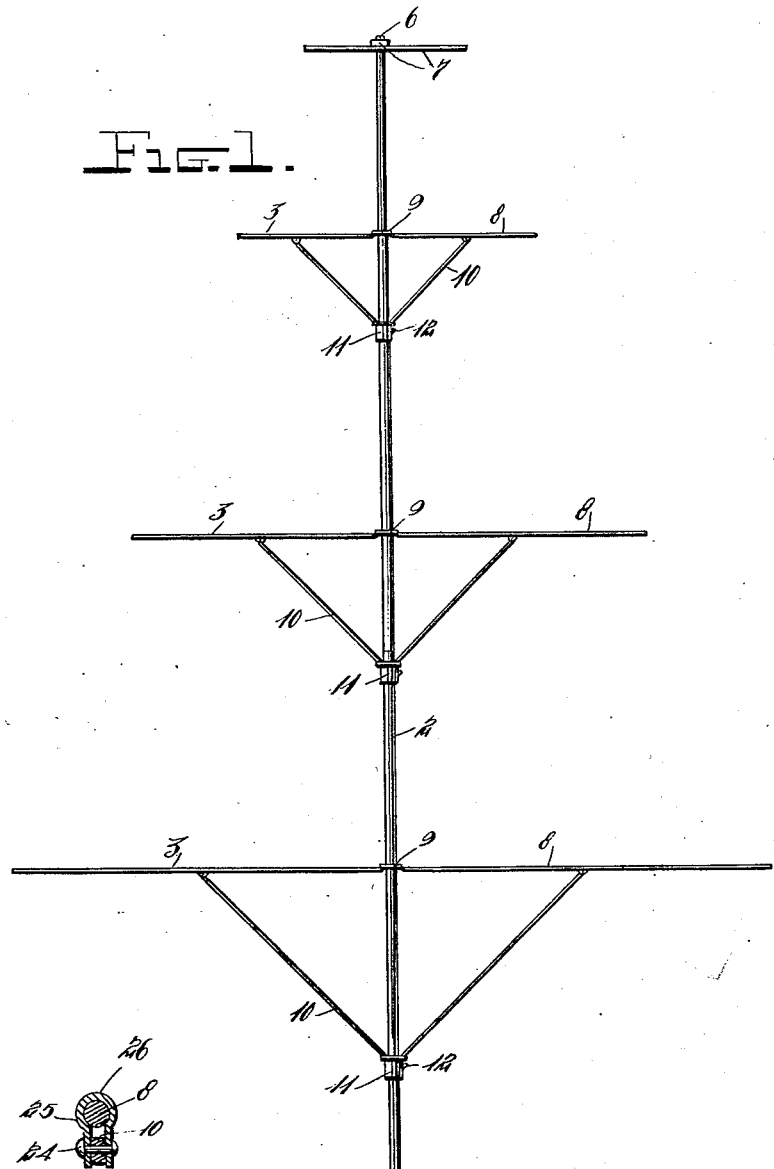

UNITED STATES PATENT OFFICE.

ENGELBERT A. STRAUB, OF RODNEY, MICHIGAN.

IMITATION TREE.

No. 843,712.　　　　Specification of Letters Patent.　　　Patented Feb. 12, 1907.

Application filed September 13, 1906. Serial No. 334,553.

*To all whom it may concern:*

Be it known that I, ENGELBERT A. STRAUB, a citizen of the United States, residing at Rodney, in the county of Mecosta and State of Michigan, have invented certain new and useful Improvements in Imitation Trees; and I do declare the following to be a full, clear, and exact description of the invention, such as will enable others skilled in the art to which it appertains to make and use the same.

This invention relates to artificial trees for use as Christmas trees at Christmas and upon other festive occasions.

The object of the invention is to provide a device of this character which when not in use may be readily collapsed to occupy but little space.

With the above and other objects in view the invention consists of certain novel features of construction, combination, and arrangement of parts, as will be hereinafter described and claimed.

In the accompanying drawings, Figure 1 is a side elevation of the improved artificial tree. Fig. 2 is a side elevation of the same, showing it in its closed position. Fig. 3 is a horizontal sectional view. Fig. 4 is a vertical section through the top of the tree. Figs. 5 and 6 are detail views of the annular head of one one of the foldable sections, and Figs. 7 and 8 are detail views of the sliding sleeve or runner of one of said sections. Fig. 9 is a detail sectional view taken on line 9 9 of Fig. 1.

The improved artificial tree comprises a base 1, a staff or stem 2, and a plurality of superposed foldable frame-sections 3, which resemble umbrella-frames. Three of the frame-sections 3 are preferably employed, the upper one being the smallest, the lower one the largest, and the middle one of intermediate size. The staff 2 is cylinderical in cross-section and has its lower end screwed into a threaded socket 4 in the base 1, which latter is composed of two crossed bars 5, with the socket 4 arranged at their center and point of intersection. At the top of the staff 2 are removably secured by a screw 6 two crossed bars 7, which are of less length than the width of the uppermost frame-section 3 when extended, so that the device as a whole when set up for use forms an upwardly-tapering frame upon which branches of trees and other decorations may be secured in any suitable manner.

The frame-sections 3 are identical in construction. Hence a description of one will suffice for all. Each comprises a plurality of foldable arms or ribs 8, pivotally connected to a stationary head or crown 9, secured at a suitable point upon the staff 2. The arms or ribs 8 are connected by braces 10 to a sliding sleeve or runner 11, which travels upon the staff 2 beneath the head 9 and which coacts with a spring-catch 12, arranged upon the staff 2 to hold the frame-section open or extended. The head or crown 9 is preferably in the form of an annular casting, in which the staff 2 is suitably secured, having in its bottom an annular groove or channel 13 to receive a pivot-wire 14, which supports the inner ends of the ribs 3 in radial recesses 15, formed at suitable points in said head. These ends of the ribs are bent outwardly to form hooks 16, which engage the pivot-wire 14 and swing in the recesses 15. The pivot-wire 14 is retained in its annular groove or seat by forming around the edge of the head 9 lugs or projections 17 and bending the latter inwardly, as clearly shown in the drawings. The runner or sliding sleeve 11 comprises a cylinder formed, preferably, of sheet metal and secured at its top to an annular plate or ring 18, which has a plurality of radially-extending notches 19 to receive the flattened and apertured ends 20 of the braces 10. Around the edge of the ring or plate 18 is formed an annular seat 21 to receive a pivot-wire 22, which passes through the apertured ends of the braces. This wire is held in its seat by integral lugs formed upon the plate 18, which project outwardly, as shown. The ring or plate 18 is secured to the cylindrical portion of the sleeve 11 by crimping the latter around the inner beaded edge of the same, as shown at 23. The outer ends of the braces 10 are flattened and apertured to receive rivets 24, which project through alining apertures in spaced ears 25, between which said ends of the braces project. These ears are formed from a single piece of heavy sheet metal, which is bent upon itself and crimped around one of the ribs 8, as shown at 26.

From the foregoing it will be seen that the frame-sections 3 are similar to umbrella-frames and that they may be raised and lowered by sliding the runners 11 upon the staff 2. When the runners are pushed upwardly and engaged with the catches 12, the frame-sections will be opened and supported in such position, so that they may be suitably decorated with branches or the like. When the device is not in use, it may be compactly folded and its top and bottom removed, so that it may be stored away in a comparatively small space.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A device of the class described comprising a base, a staff projecting therefrom, cross-bars removably secured upon the top of said staff, a plurality of foldable frame-sections superposed upon said staff, said frame-sections decreasing in size from the bottom up toward the top of the staff, each of said frame-sections comprising a head fixed upon said staff, radial arms pivoted to said head and adapted to fold downwardly, a runner slidable upon said staff, braces pivotally connected with said runner and with said arms, and a spring-catch for holding said runner in raised position.

2. A device of the class described comprising a base having cross-bars and a central socket, a staff removably secured in said socket, cross-bars removably secured upon the top of said staff, a plurality of foldable frame-sections superposed upon said staff, said frame-sections decreasing in size from the bottom toward the top of the staff and each comprising a head fixed upon said staff, radial arms pivoted to said head, a runner slidable upon said staff, braces pivotally connected to said runner and to said arms and catches upon said staff to engage said runners to hold them in raised position.

In testimony whereof I have hereunto set my hand in presence of two subscribing witnesses.

ENGELBERT A. STRAUB.

Witnesses:
E. F. KETCHUM,
P. W. BRECKNEY.